United States Patent
Fujii et al.

(10) Patent No.: US 7,486,461 B2
(45) Date of Patent: Feb. 3, 2009

(54) MAGNETIC DISK DEVICE AND READ/WRITE METHOD

(75) Inventors: Yoshikatsu Fujii, Kanagawa (JP); Soichi Isono, Kanagawa (JP); Tomoki Ooura, Kanagawa (JP); Minoru Tsukada, Kanagawa (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 152 days.

(21) Appl. No.: 11/172,201

(22) Filed: Jun. 29, 2005

(65) Prior Publication Data
US 2005/0286152 A1 Dec. 29, 2005

(30) Foreign Application Priority Data
Jun. 29, 2004 (JP) ............................. 2004-191130

(51) Int. Cl.
*G11B 5/09* (2006.01)
(52) U.S. Cl. .......................................................... 360/51
(58) Field of Classification Search ................... None
See application file for complete search history.

(56) References Cited

U.S. PATENT DOCUMENTS

| 5,506,735 A * | 4/1996 | Okazaki ........................ 360/75 |
| 6,937,410 B2 * | 8/2005 | Koyanagi ....................... 360/46 |
| 2004/0114269 A1 | 6/2004 | Ito |

\* cited by examiner

*Primary Examiner*—Joseph H Feild
*Assistant Examiner*—Daniell L Negrón
(74) *Attorney, Agent, or Firm*—Townsend and Townsend and Crew LLP; Patrick Duncan

(57) ABSTRACT

Embodiments of the invention eliminate the unnecessary disk format margin to raise the format efficiency. In one embodiment, a disk control unit (MPU) predicts the variation of the next servo sector pulse interval based on each learnt servo sector pulse interval. From this predicted interval, an optimal variation of the data sector pulse interval is determined for the current servo sector pulse. This optimal variation is set to an internal register of the hard disk controller (HDC). Based on this set variation, an internal calculation circuit calculates a corrected data sector pulse interval. Thus, data sector pulses are output at intervals optimized on an individual servo sector basis.

9 Claims, 6 Drawing Sheets

MAGNETIC DISK DEVICE AND READ/WRITE METHOD

CROSS-REFERENCES TO RELATED APPLICATIONS

This application claims priority from Japanese Patent Application No. JP 2004-191130, filed Jun. 29, 2004, the entire disclosure of which is incorporated herein by reference.

BACKGROUND OF THE INVENTION

The present invention relates to a disk device which provides an improved disk format efficiency when a disk eccentricity occurs.

Data storage devices using various types of media such as optical disks and magnetic tapes are known. Among them, hard disk drives (HDDs) have become popular as storage devices for computers to such an extent that they are one of the storage devices indispensable for today's computers. Further, not limited to computers, their application is widening more and more due to the superior characteristics with the advent of moving picture recording/reproducing devices, car navigation systems, removable memories for digital cameras and so on.

Usually, a HDD has magnetic disks as media. In the manufacturing process, the magnetic disks are fixed around the rotary axis of a spindle motor so that they are driven to rotate by the spindle motor. Due to the manufacture or structure, however, spacing occurs between the rotary axis and the magnetic disks. This spacing causes the magnetic disks to rotate eccentrically since the center of the magnetic disks is deviated from the center of the rotary axis. In addition, if the HDD is mounted in such a portable storage device as mentioned above, a still larger disk eccentricity may occur since the HDD is likely to be given external shocks during use. Servo data to control the position of a read/write head is written to tracks on a magnetic disk on the assumption that the magnetic disk would rotate normally. Thus, if a disk eccentricity occurs in read or write operation, the head sees a larger rotary variation than in normal rotation. This may make it impossible for the magnetic head to accurately locate itself, resulting in increased servo data read errors. Conventionally, to reduce these read errors, the interval between servo data timing-indicating servo sector pulses generated based on servo data is corrected. However, this correction of the servo sector pulse interval makes the disk format regions different along the same track among different servo sectors.

Meanwhile, user data is read/written to/from the magnetic disk by the magnetic head. Usually, user data read/write timing-indicating data sector pulses are generated at equal intervals according to a clock which operates at a fixed frequency. Therefore, the disk format requires a certain margin region in order to absorb the variations. This margin region becomes a format loss.

BRIEF SUMMARY OF THE INVENTION

It is a feature of the present invention to raise the format efficiency by generating each data sector pulse at optimal timing when the disk has an eccentricity so as to eliminate the unnecessary disk format margin.

In this regard, a disk control unit (MPU) predicts the variation of the next servo sector pulse interval based on each learnt servo sector pulse interval. From this predicted interval, an optimal variation of the data sector pulse interval is determined for the current servo sector pulse. This optimal variation is set to an internal register of the hard disk controller (HDC). Based on this set variation, an internal calculation circuit of the HDC calculates a corrected data sector pulse interval. Thus, data sector pulses are output at intervals optimized on the basis of each servo sector. This eliminate the unnecessary margin regions, resulting in an improved format efficiency.

The variation of each servo sector due to disk eccentricity is learnt. Since data sector pulses are generated based on this learning result, the timing of generating data sector pulses can be optimized for each disk device which has a specific disk eccentricity. Therefore, it is possible to cope with disk eccentricities and raise the disk format efficiency, which contributes to improving disk devices in shock resistance and storage capacity. A typical recent disk device allows about 30 μs for eccentricity. According to the present invention, such a device can raise the format efficiency by as much as some 12%.

DETAILED DESCRIPTION OF THE INVENTION

An embodiment of the present invention will be described below by using the drawings.

Figure 1:
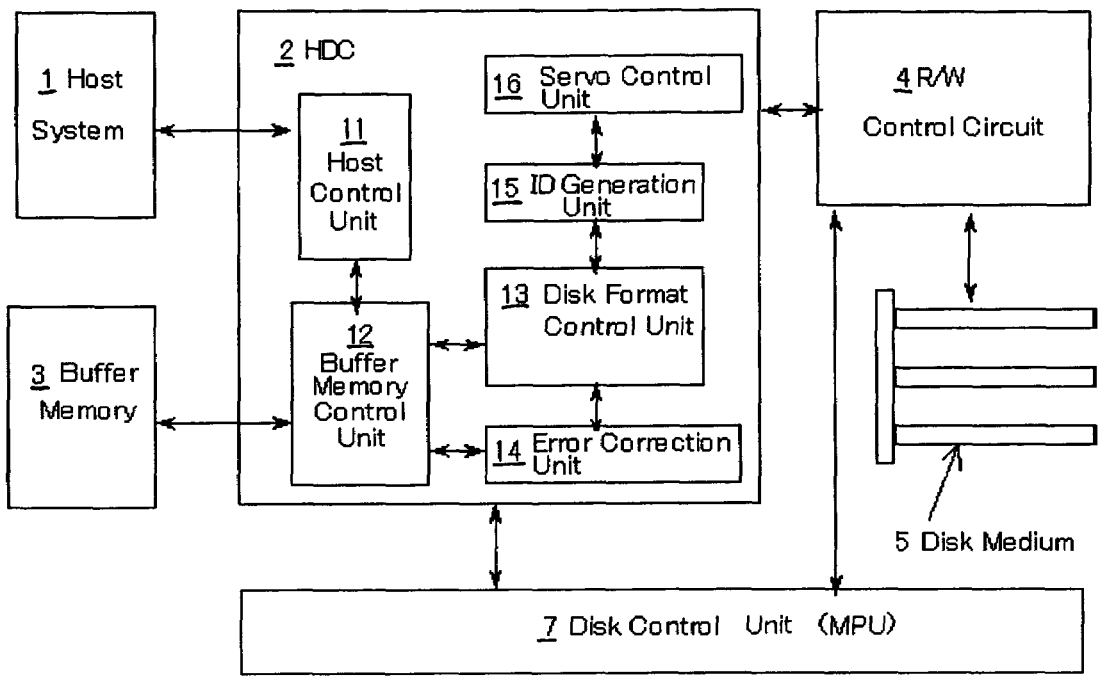
FIG. 1 is a block diagram showing the configuration of a magnetic disk device according to an embodiment of the present invention.

FIG. 1 is a block diagram showing the configuration of a magnetic disk device according to an embodiment of the present invention. Data read out from a medium 5 is entered into a HDC 2 by way of a R/W control circuit 4. This data is temporally stored in a buffer memory 3 and sent to a host system 1 again via the HDC 2. Write operation is done opposite to this. Disk control unit or micro processing unit (MPU) 7 controls the general performance of the HDC 2 and R/W control circuit 4. The block diagram of the HDC 2 is shown conjunctively. As control units to interface with other blocks, the HDC 2 has a host control unit 11, a buffer memory control unit 12 and a disk format control unit 13. The host control unit 11 is a block to exchange data with the host system 1. The buffer memory control unit 12 is a block to arbitrate among the other blocks of the HDC 2 as to the right to use the buffer memory 3 as well as to exchange data with the buffer memory 3. The disk format control unit 13 is a block to generate a disk medium 5 record format and exchange data with the R/W control circuit 4. The other major blocks of the HDC 2 include: an error correction unit 14 to perform data error correction; an ID generation unit 15 to generate position information for write/read to/from the disk medium 5; and a servo control unit 16 to detect servo sectors and generate servo gates.

Figure 2:
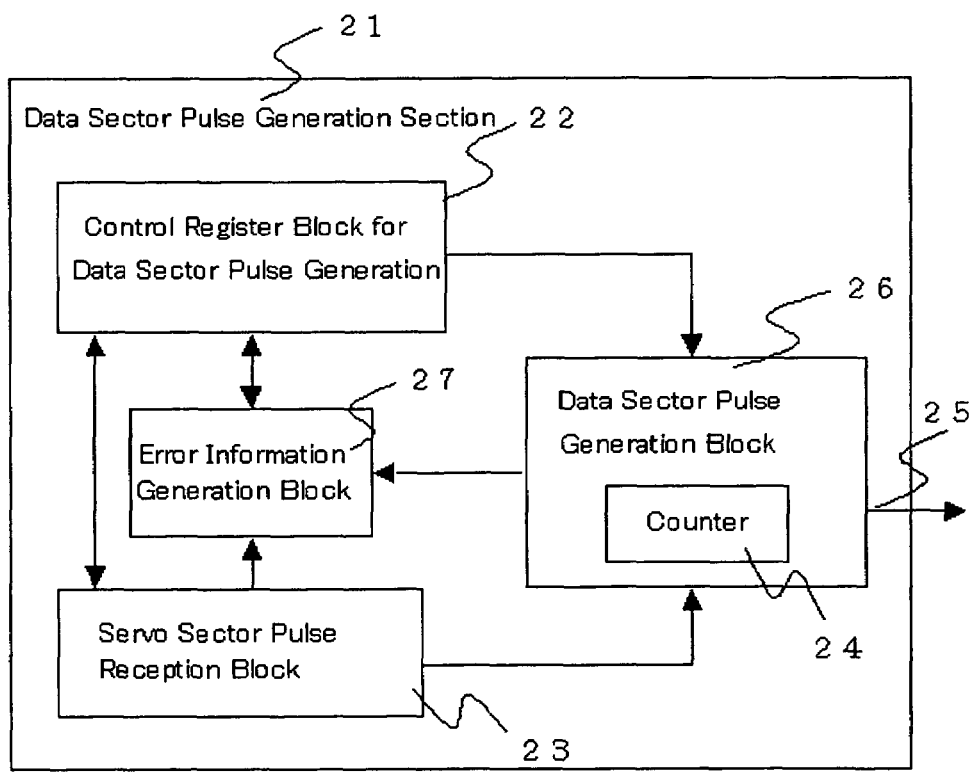
FIG. 2 is a block diagram showing the functional configuration of a data sector pulse generation section in an ID generation unit of a conventional HDC.

Starting from FIG. 2, the following describes the performance of this embodiment step by step.

FIG. 2 shows the functional block diagram of a conventional data sector pulse generation section 21 in the ID generation unit 15. This data sector pulse generation section 21 comprises four major functional blocks as outlined below. These four blocks are: a block 22 comprising a control register group for generating data sector pulses; a block 23 by which servo sector pulses entered into the data sector pulse generation section 21 in the ID generation unit 15 from the servo control unit 16 is received and synchronized to the clock; a data sector pulse generation block 26 which outputs data sector pulses 25 to the external at intervals adjusted through an internal counter 24 based on the information from the blocks 22 and 23; and an error information generation block 27 which generates error information as necessary from the information entered from the blocks 23 and 26 and outputs the error information to the block 22.

Figure 3:
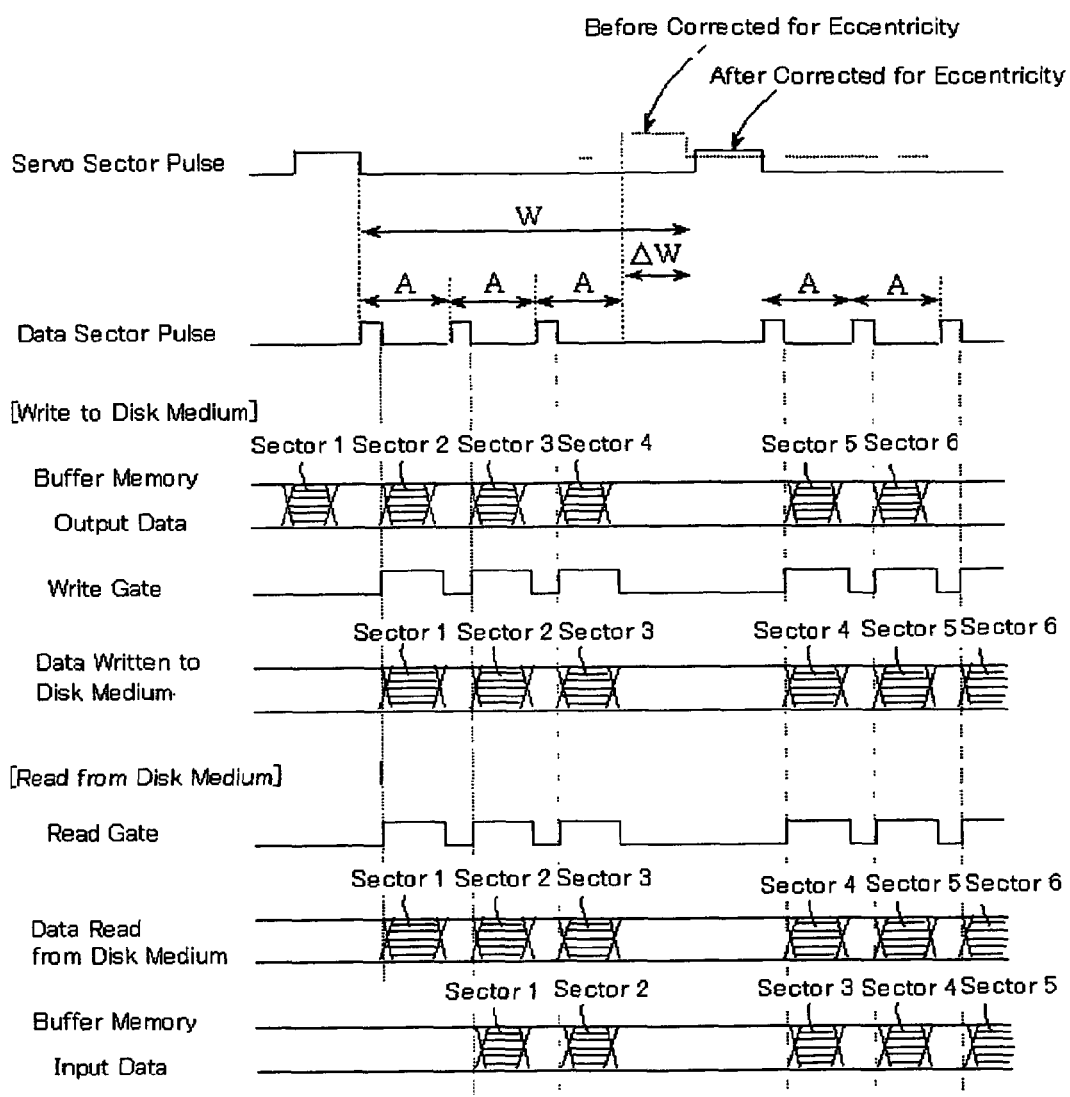
FIG. 3 is a bus output timing chart of data sector pulses and associated control signals/data in a magnetic disk device which is not provided with the function to correct data sector pulses for the eccentricity of the disk.

FIG. 3 shows a bus output timing image of data sector pulses and related control signals and data which are generated in a magnetic disk device which is not provided with the function to correct data sector pulses for the eccentricity of the disk. Following the output of a servo sector pulse, data sector pulses are generated by the data sector pulse generation section 21 in the ID generation unit 15 at always fixed intervals as indicated by A in the figure.

For write to the disk medium, output data from the buffer memory 3 is temporally stored in the disk format control unit 13 via the buffer memory control unit 12. The disk format control unit 13 generates a write gate signal which is used as a signal to enable write to the disk medium 5. In synchronization with this signal, the disk format control unit 13 outputs the buffer memory output data to the R/W control circuit 4. For read from the disk medium, a read gate signal which is used as a signal to enable read from the disk medium 5 is generated in the disk format control unit 13 and output to the R/W control circuit 4. In response to this signal, data is read from the disk medium 5. The read data is temporally stored in the disk format control unit 13 and, after given error correction and the like, entered into the buffer memory 3. When write is done, the buffer memory output data, write gate and write data to be output are all triggered by data sector pulses which are output at fixed intervals as shown in the figure. Likewise, when read is done, the read gate, read data and buffer memory input data are all triggered by such data sector pulses. Thus, these signals are output at fixed timings as well.

Generally, the servo sector pulses generated in the servo control unit 16 are entered into the ID generation unit 15 at intervals which are changed on an individual pulse basis so as to reduce servo information read errors which would occur when the disk has an eccentricity. On the other hand, the data sector pulse generation section 21 in the ID generation unit 15 generates data sector pulses at always fixed intervals. Therefore, of the data region defined in the figure by W, a portion defined by $\Delta W$, namely the portion created as the result of correcting the servo sector pulse for the eccentricity becomes a waste. This causes a direct loss in the disk format.

Figure 4:
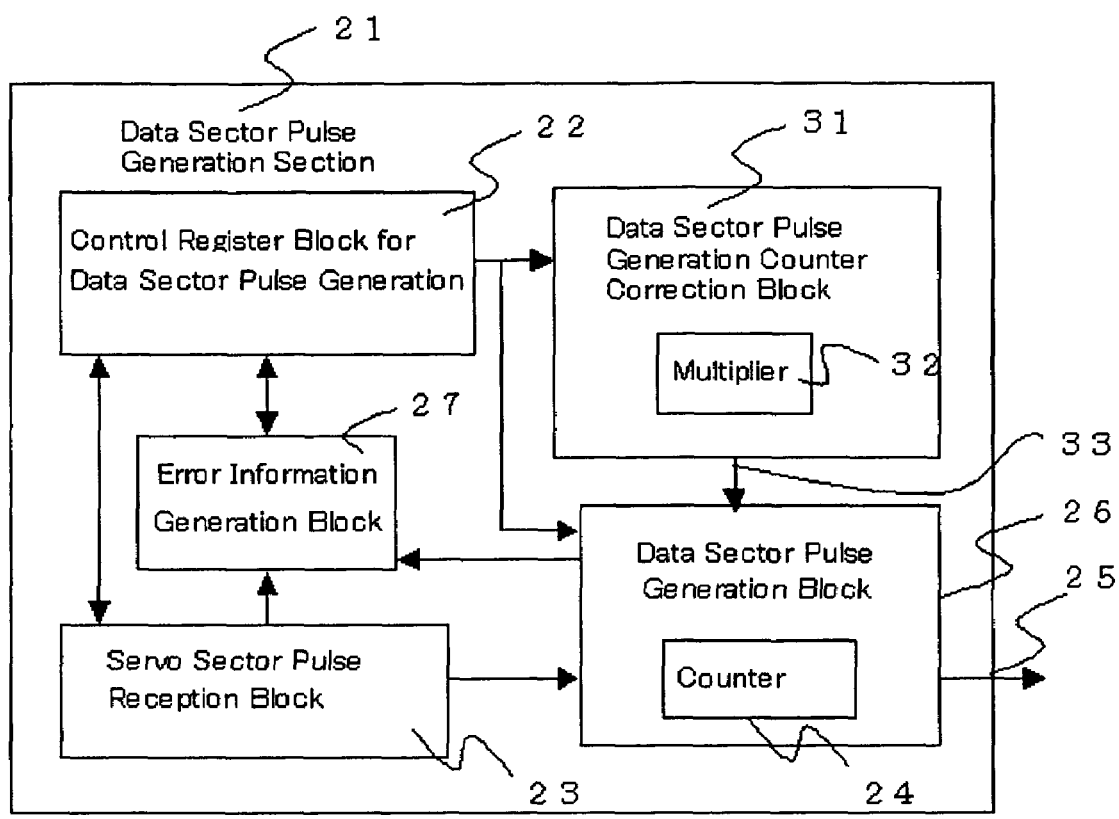
FIG. 4 is a block diagram showing the functional configuration of a data sector pulse generation section in a HDC ID generation unit according to an embodiment of the present invention.

Thus, the present invention solves the above-mentioned problem by incorporating a data sector pulse generation counter correction block 31 in the data sector pulse generation section 21 as shown in FIG. 4. Optimal variation $\Delta L$ of the data sector pulse interval from the standard interval is set by the disk control unit 7 to the data sector pulse generation control register block 22 and received by the data sector pulse counter correction block 31. According to the received variation $\Delta L$, the internal multiplier 32 calculates a corrected data sector pulse generation counter value 33. Based on the corrected new data sector pulse generation counter value 33, the data sector pulse generation block 26 generates and externally outputs data sector pulses 25 which reflect the variation. The following describes how the variation $\Delta L$ is calculated by the disk control unit 7.

1. Detect an interrupt from the servo control unit 16 at an edged transition of a servo sector pulse.

2. Refer to register information in the data sector pulse generation control register block 22 and learn the servo sector pulse interval. If the disk has an eccentricity, this interval may vary much from the standard value (normal interval).

3. Calculate the variation from the standard value by comparing the learnt servo sector pulse interval with the standard value which is preliminarily stored in a table or the like.

4. Based on the variations obtained for the last five or ten servo sector pulses by the above step 3, predict the variation of the next servo sector pulse interval.

The variation predicted by the above step 4 corresponds to $\Delta L$. In existing devices, one track has 100 to 200 servo sectors. Therefore, it is sufficiently possible to predict the variation of the next servo pulse interval based on the variation information obtained from about 5% of these servo sectors or 5 to 10 servo sector pulses.

Figure 5:
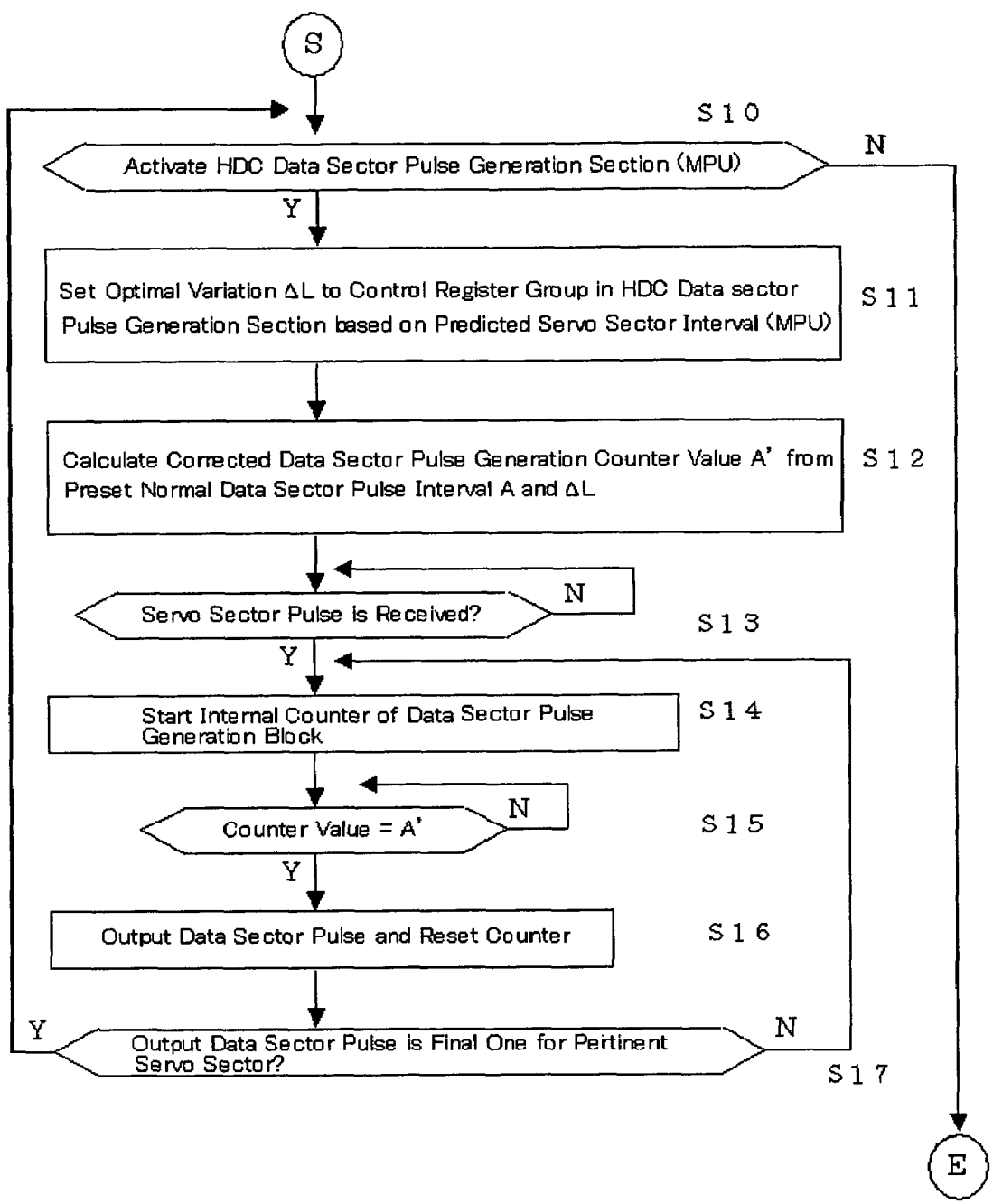
FIG. 5 is a flowchart showing an example of a method to generate data sector pulses which are corrected for the disk eccentricity.

FIG. 5 is a flowchart indicating an example of the operation of data sector pulse generation section 21 according to this method. The disk control unit 7 activates the data sector pulse generation section 21 in the ID generation unit 15 (Step S10) and sets an optimum variation $\Delta L$ to the data sector pulse generation control register block 22 in the ID generation unit 15 based on a servo sector interval predicted as mentioned above (Step S11). In response to this, the data sector pulse generation counter correction block 31 in the ID generation unit 15 calculates a corrected data sector pulse counter value A' from a preset normal data sector pulse interval and the variation $\Delta L$ (Step S12). For example, A' may be calculated as $(A'=(1+\Delta L) \times A)$. If the servo sector pulse reception block 23 in the ID generation unit 15 receives a servo sector from the servo sector unit 16 (Step S13), the internal counter 24 of the data sector pulse generation block 26 begins to count (Step S14). When the counter reaches the corrected counter value A' (Step S15) calculated in advance, the data sector pulse generation block 26 outputs an data sector pulse 26 to the external and resets the counter 24 (Step S16). At this point in time, it is judged whether the data sector pulse output from the ID generation unit 15 is the final data sector pulse for the pertinent servo sector. If the data sector pulse is not final, counter operation is restarted in Step S14. If the data sector pulse is final, the data sector pulse generation section 21 waits for another optimal variation $\Delta L$ to be set by the disk control unit 7 in Step S11.

Figure 6:
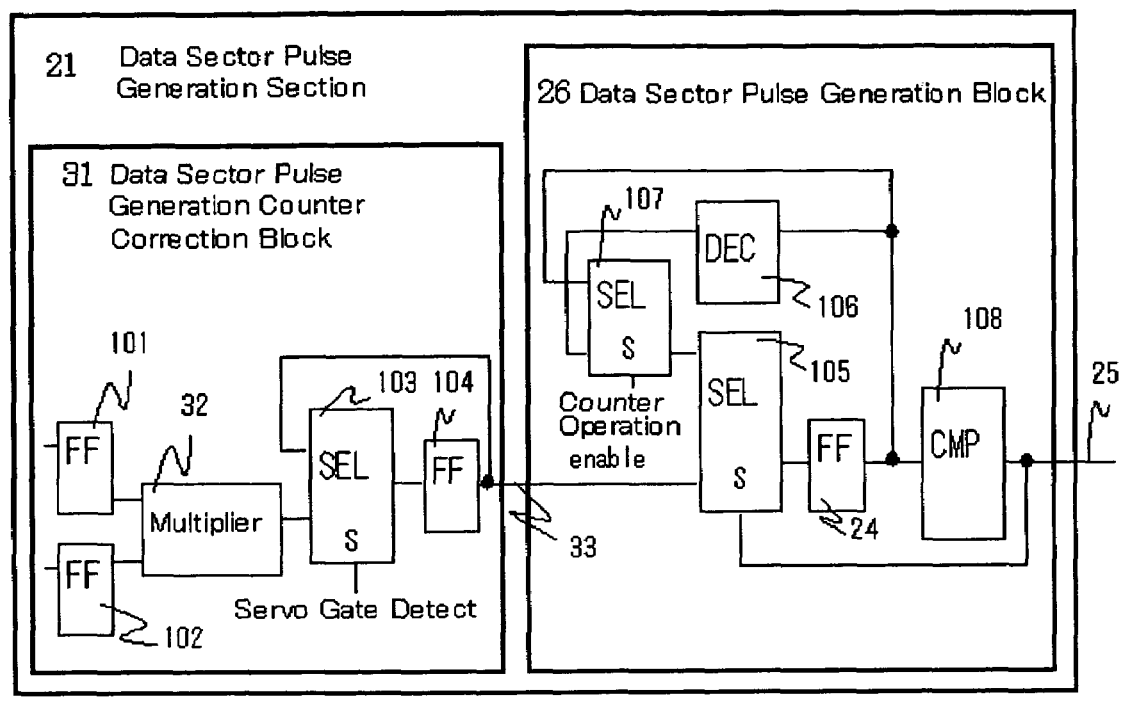
FIG. 6 is a block diagram showing an example of the general circuit configuration of a data sector pulse generation section according to an embodiment of the present invention.

Shown in FIG. 6 is an example of a general circuit configuration which implements the data sector pulse generation section 21 of the present embodiment. The disk control unit 7 sets a normal data sector pulse interval and an optimal variation $\Delta L$ respectively to flip-flop (FF) circuits 101 and 102. In the data sector pulse generation counter correction block 31, the output of the multiplier 32 is entered into a flip-flop circuit 104 via a selector circuit (SEL) 103 upon detection of a servo gate as a trigger. The output of the selector circuit 103 is a corrected data sector pulse generation counter value 33 and forwarded to the data sector pulse generation block 26. In this block, outputting a data sector pulse 25 acts as a trigger to enter the value 33 into a counter 24 made of a flip-flip circuit from a selector circuit 105. While the counter 24 is enabled, decrement continues through a decrementer (DEC) 106 and selector circuit 107 path. When it is judged by a comparator (CMP) 108 that the counter 24 value has reached a predetermined value, a data sector pulse 25 is generated and output to the external.

Figure 7:
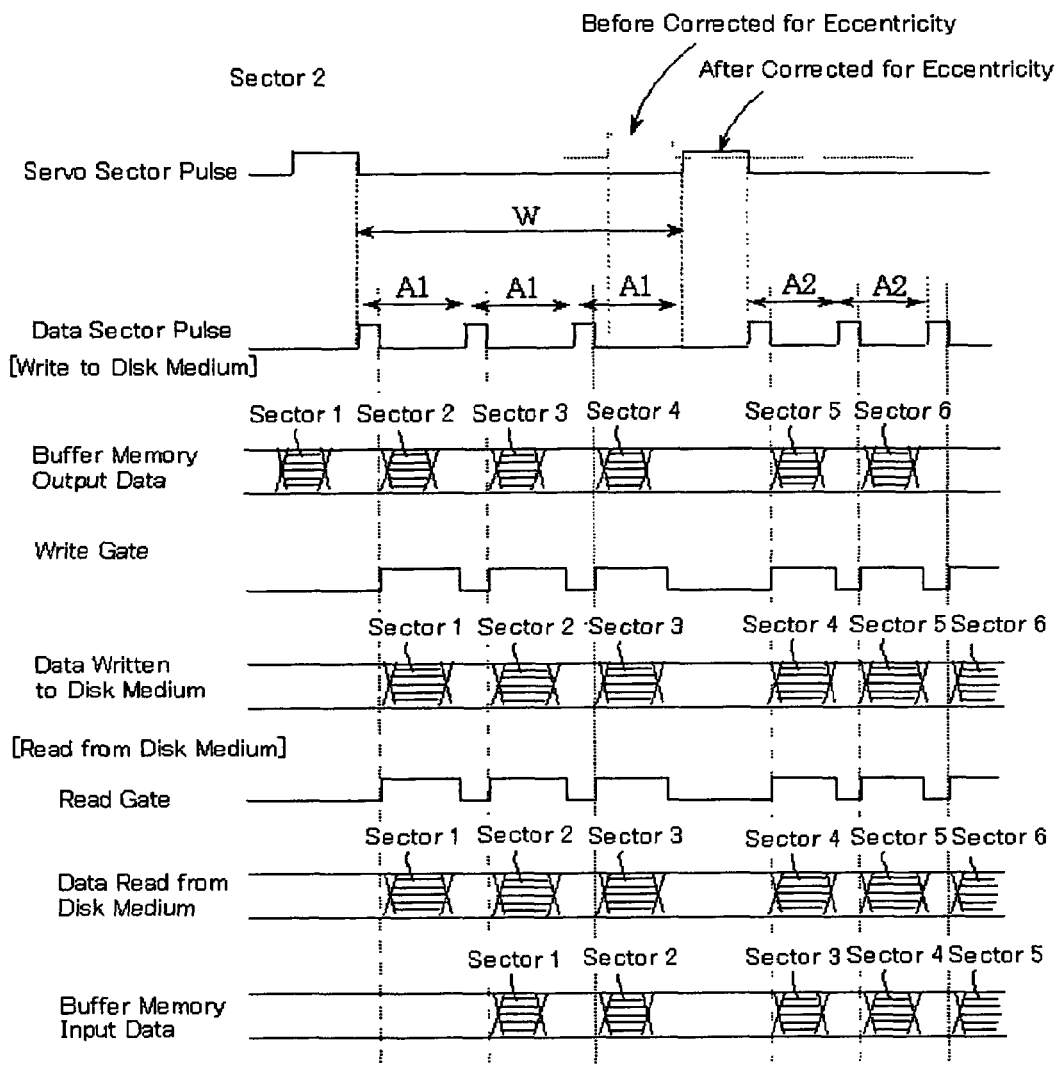
FIG. 7 is a bus output timing chart of data sector pulses and associated control signals/data in a magnetic disk device which is provided with the function to correct data sector pulses for the eccentricity of the disk.

FIG. 7 shows an output timing image of data sector pulses generated for servo sector pulses in a magnetic disk device embodiment of the present invention. In FIG. 3, data sector pulses are generated at fixed intervals as indicated by A. In FIG. 7, considering the correction for the disk eccentricity, the data sector pulse interval is varied (as A1 and A2 in the figure) on an individual servo sector pulse basis. Since the disk format loss indicated by ΔW in FIG. 3 is eliminated, this can provide an improved raised disk format efficiency. Note that the buffer memory output data, write gate and write data to the disk medium for write operation and the read gate, read data from the disk medium and buffer memory input data for read operation are changed in terms of output timing for each servo sector pulse whereas they are output at fixed timings in FIG. 3.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk device comprising:
    a magnetic disk to store servo data and record/reproduce user data;
    a magnetic head to read the servo data and read/write the user data;
    a disk control unit which predicts the variation of the servo sector pulse interval indicating the timing of the servo data read by the magnetic head and sets an optimal variation of the data sector pulse interval which prescribes the user data read/write timing for the servo sector pulse interval; and
    a disk controller which generates data sector pulses based on the set optimal variation of the data sector pulse interval and outputs the data sector pulses to the magnetic head,
    wherein the optimal variation of the data sector pulse interval is set based on a predicted variation of the servo sector pulse interval, wherein the disk control unit is configured to detect an interrupt from a servo control unit of the disk controller at an edged transition of a servo sector pulse, refer to register information in a data sector pulse generation control register block of the disk controller and learn the servo sector pulse interval,— obtain a variation from a previously stored standard value by comparing the learnt servo sector pulse interval with the standard value, and predict the variation of the next servo sector pulse based on the variations obtained for a number of preceding servo sector pulses.

2. A magnetic disk device according to claim 1, wherein the data sector pulses are generated by a data sector pulse generation section in the disk controller.

3. A magnetic disk device according to claim 2, wherein a calculation for generating the data sector pulses based on the optimal variation is performed by a data sector pulse generation counter correction block in the disk controller.

4. A magnetic disk device according to claim 3, wherein the data sector pulse generation counter correction block includes a multiplier which calculates a corrected data sector pulse generation counter value based on the optimal variation of the data sector pulse interval.

5. A magnetic disk device according to claim 4, wherein the disk controller includes a data sector pulse generation block which generates and externally outputs data sector pulses based on the corrected data sector pulse generation counter value.

6. A magnetic disk device according to claim 1, wherein the variation of the next servo sector pulse is predicted based on the variations obtained for about 5 to 10 preceding servo sector pulses.

7. A magnetic disk device comprising:
    a magnetic disk to store servo data and record/reproduce user data;
    a magnetic head to read the servo data and read/write the user data;
    a disk control unit which predicts the variation of the servo sector pulse interval indicating the timing of the servo data read by the magnetic head and sets an optimal variation of the data sector pulse interval which prescribes the user data read/write timing for the servo sector pulse interval; and
    a disk controller which generates data sector pulses based on the set optimal variation of the data sector pulse interval and outputs the data sector pulses to the magnetic head,
    wherein the optimal variation of the data sector pulse interval is set based on a predicted variation of the servo sector pulse interval, wherein the variation of the servo sector pulse interval is predicted based on the result of comparing the normal servo sector pulse interval with the servo sector pulse interval subject to the eccentricity of the magnetic disk.

8. A read/write method for reading stored servo data and reading/writing user data, comprising:
    predicting the variation of the servo sector pulse interval indicating the timing of the servo data;
    based on the prediction, setting an optimal variation of the data sector pulse interval which prescribes the user data read/write timing for the servo sector pulse interval;
    based on the set optimal variation of the data sector pulse interval, generating the data sector pulses; and
    outputting the generated data sector pulses, wherein predicting the variation of the servo sector pulse interval comprises:
    detecting an interrupt from a servo control unit of the disk controller at an edged transition of a servo sector pulse;
    referring to register information in a data sector pulse generation control register block of the disk controller and learning the servo sector pulse interval;
    obtaining a variation from a previously stored standard value by comparing the learnt servo sector pulse interval with the standard value; and
    predicting the variation of the next servo sector pulse based on the variations obtained for a number of preceding servo sector pulses.

9. A read/write method according to claim 8, wherein the variation of the servo sector pulse interval is predicted based on the result of comparing the normal servo sector pulse interval with the servo sector pulse interval subject to the eccentricity of the magnetic disk.

* * * * *